March 24, 1936.  H. DREYFUS  2,034,716
PRODUCTION OF SHEET MATERIALS
Filed April 18, 1933
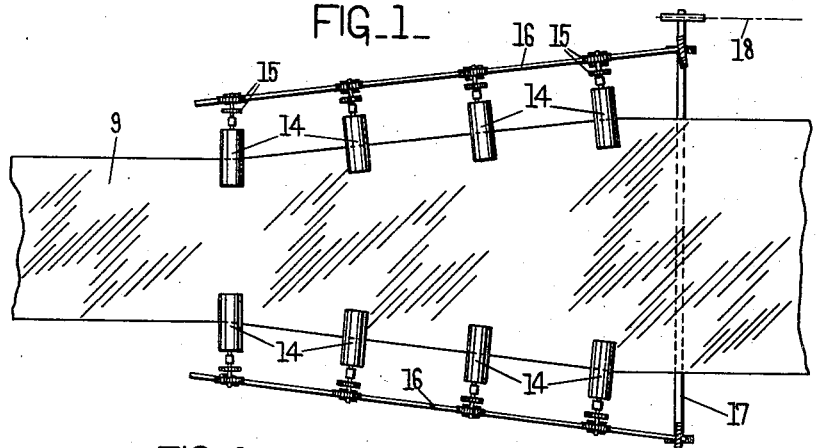
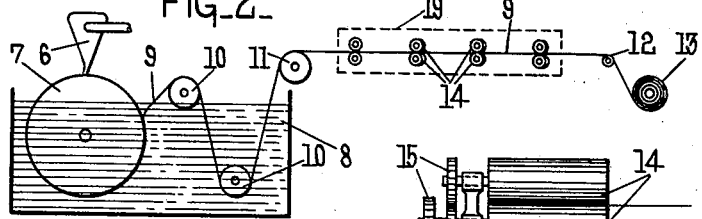
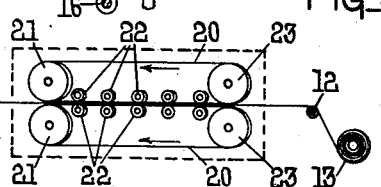
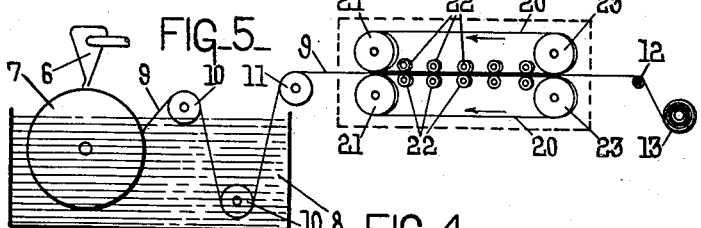
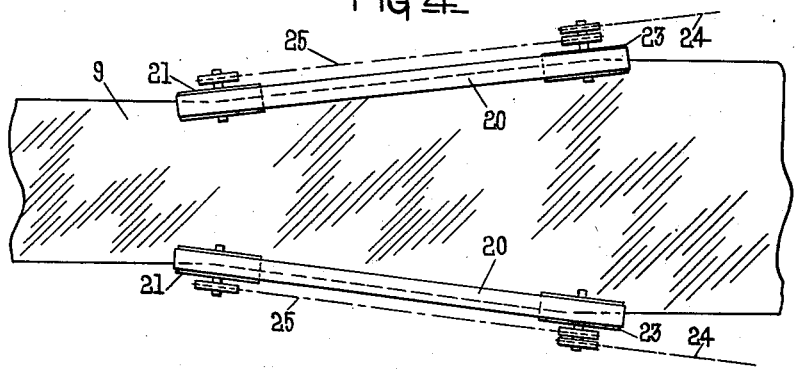
Inventor
Henry Dreyfus
by
J Seltzer and Lieberman
Attorneys Patented Mar. 24, 1936

2,034,716

UNITED STATES PATENT OFFICE 2,034,716

PRODUCTION OF SHEET MATERIALS

Henry Dreyfus, London, England

Application April 18, 1933, Serial No. 666,655
In Great Britain April 21, 1932

10 Claims. (Cl. 18—57)

This invention relates to improvements in the production of sheet materials and more particularly it relates to the manufacture of artificial films or foils, especially those suitable for wrapping purposes from solutions of cellulose acetate or other cellulose derivatives, and the improved process is especially designed to produce films or foils of high tensile or tearing strength.

I have found that highly valuable films or foils may be obtained by extruding a solution of a cellulose derivative in an organic solvent or solvent mixture through an orifice of the requisite shape to produce the desired film or foil into a coagulating medium which is a non-solvent for the cellulose acetate or other cellulose derivative, but which contains a solvent or strong softening agent for the cellulose derivative. In particular the coagulating media which I employ contain solvents or strong softening agents for the cellulose derivative in high concentration. By this means I have found that the films or foils may be stretched during or immediately subsequent to their formation to a considerable extent and thus give rise to products of high tensile or tearing strength. The stretch may be applied to the films or foils longitudinally, but is preferably applied both laterally or transversely and longitudinally, the lateral or transverse tension being sufficient to produce a widening of the film or foil or sufficient only to prevent any narrowing of the width consequent upon the longitudinal extension.

While the invention may be applied to the production of films and sheets, it is of particular value in the manufacture of relatively thin foils, such as are used for wrapping purposes.

As already indicated the coagulating media which I employ for the purpose of the present invention contain, preferably in high concentration, a solvent or softening agent for the cellulose derivative. Such solvent or softening agent may be either volatile or relatively non-volatile, and such solvent or softening agent may be less or more volatile than, or of the same volatility as, any diluent which is employed in the coagulating medium to restrain the solvent or softening action of said agent. I prefer to employ a solvent or softening agent which is less volatile than, or of the same volatility as, any diluent which is employed, so that at no stage of the operation is it possible for the solvent action of the medium upon the material to decrease substantially and thus give rise to precipitation or at least to the production of opaque products. A wide range of solvents or softening agents is available for the purpose of the present invention, but it is particularly useful to employ solvents which by reason of their innocuous properties need not be entirely removed from the films or foils. A residue of such a solvent or softening agent may be allowed to remain therein so as to impart to the film or foil greater flexibility, or may be removed by evaporation only. The chlorinated hydrocarbon type of solvent or softening agent, such as methylene chloride, ethylene chloride, chloroform, tetrachlorethane and the like may be used, but on account of their toxic properties they are less valuable than a large number of other solvents or softening agents. As examples of agents which are particularly adapted for use in accordance with the present invention I may mention diacetone alcohol, acetone, the ethers, cyclic or non-cyclic, of glycols, glycerine and other polyhydric alcohols, and the esters and ether-esters of the di- and poly-hydric alcohols, for instance mono- and di-ethers of ethylene or diethylene glycol, glycol mono-acetate, methyl glycol mono-acetate, dioxane, the homologues and substitution products of dioxane, such as diethylene-di-oxide-dicarbinol-diacetate and other cyclic ethers, e. g. ethylene methylene dioxide, monomethyl and ethyl ethers of propylene glycol, mono-, di- and tri-acetins, ethyl lactate, diethyl tartrate and similar esters and ethers or ether-esters. Acid agents, for example formic acid, acetic acid, and lactic acid do not yield such valuable results as the neutral type of solvent previously mentioned.

In general such agents will be employed with suitable diluents, for example water, glycol, glycerol or other hydroxy compounds or water immiscible liquids, such as benzene, toluene, xylene and other cyclic hydrocarbons, benzine, petrol ether, kerosene and other hydrocarbons of the aliphatic or petroleum series, carbon tetrachloride, trichlorethylene and other chlorinated or halogenated compounds which are inert or comparatively inert towards the cellulose derivative, and high boiling diluents, for example tetrahydronaphthalene and dekahydronaphthalene.

It is particularly advantageous in accordance with the present invention to employ the solvents or strong softening agents in relatively high concentration. Agents which are not themselves true solvents, as for example tricresyl phosphate, triphenyl phosphate, diethyl phthalate and the liquid sulphonamides, for example the mono-methylated isomeric xylene sulphonamides, may be employed even in a 100% concentration. Agents which are true solvents, such as a large majority of the agents previously mentioned, must be diluted with a suitable diluent, and I find it particularly advantageous to employ such agents, and particularly diacetone alcohol, ethyl lactate, dioxane, ethylene methylene dioxide, glycol mono-acetate and methyl glycol mono-acetate and other agents having a similar solvent power, in a concentration varying from about 20 to 60% in aqueous or alcoholic solution.

The coagulating media may contain in addition to the solvents or softening agents salts, sugars or other agents which diminish the solubility of the solvent in the non-solvent of the coagulating medium, and particularly those having little or no solvent action upon the cellulose derivative. Thus, for instance, salts of the most varied character, which have no solvent action upon the cellulose derivative, may be employed, for example, sodium sulphate, sodium chloride, sodium acetate, sodium nitrate and sodium phosphate, ammonium sulphate, ammonium chloride and ammonium nitrate and potassium sulphate, potassium chloride, potassium nitrate, potassium acetate and potassium phosphate. Sugars which may be employed are glucose, fructose, sucrose, xylose, mannitol, sorbitol, cellubiose, γ-cellulose or other soluble degradation or depolymerization products of cellulose. In general these salts or sugars will be employed in relatively low concentrations, or at least in concentrations insufficient to cause a separation of the solvent from the non-solvent of the coagulating medium. With concentrations of aqueous diacetone alcohol and like agents of about 40%, the highest permissible proportions of these salts are usually below 10% on the weight of the total medium, and similarly sugars are usually restricted to under 20%. With lower concentrations of solvent higher concentrations of salts or sugars may be used. In some cases the bath may contain little or no solvent or softening agent and high proportions of salts which have little or no solvent action upon the cellulose derivative. Thus, for instance, concentrated solutions of calcium chloride or of ammonium acetate may be employed, but it is found that the use of such coagulating medium is less advantageous that the use of a medium which contains proportions of solvents or softening agents.

The film-forming solution may consist of cellulose acetate or other cellulose derivative dissolved in a suitable solvent such as acetone, methylene ethylene dioxide, methyl ethyl ketone or the like and may contain other substances such as medium and high boiling solvents and plasticizers, e. g. those mentioned above in connection with the coagulating baths. Pigments, whether white or coloured, dyestuffs, and natural or synthetic resins may also be added. The solution may be extruded or flowed directly from a suitably shaped orifice into a coagulating bath or may be extruded on to a suitable roller or other moving support wholly or partly immersed in the coagulating bath.

As already stated the greatest advantages in relation to tensile or tearing strength are obtained when the films or foils during coagulation or immediately after coagulation are given a longitudinal stretch, and preferably a transverse stretch and a longitudinal stretch, the lateral stretch being either so as to prevent actual shrinkage in width or to produce an increase in width. One form of stretching device which is particularly effective in thus producing an extension in the width of the film or foil or in preventing lateral contraction consists in two pairs of nip rollers arranged to engage the sides of the sheet of material and having their axes set at an angle to the width of the material, so that in nipping the sheet and carrying it forward the rollers draw its edges sideways and extend it to a degree dependent on the angular inclination of the roller axes and the peripheral speed of the rollers in relation to the linear rate of delivery of the sheet of the material. The transverse component of the motion of the roller surfaces relative to the material operates to impart the transverse stretch, or at least to prevent a lateral contraction. At the same time the longitudinal component of such motion may be higher than the rate of the delivery of the material so as to impart longitudinal stretch.

This device consisting of two pairs of nip rollers, may be repeated at intervals along the length of the film or foil undergoing coagulation so as to impart a progressive stretch and so that in order to achieve any particular stretch relatively small tensioning forces may be applied to any one part of the sheet or foil.

In order to grip the material firmly and yet to avoid damaging the surface or otherwise injuring the material, the rollers may be made of or surfaced with resilient material, such as rubber.

Instead of employing a series of rollers to stretch the sheet or foil as described above, any other device may be employed such as for example two pairs of travelling bands adapted to nip the edges of the sheet or foil and cause the edges to follow a diverging path, thus effecting a transverse stretch of the foil. The linear speed of the bands may be such that the foil is also stretched longitudinally during its travel from the extrusion orifice to the bands.

The invention is not limited to simultaneous application of the lateral and longitudinal stretching forces. If desired the lateral stretching forces may be applied by marginal rollers or bands as already referred to, and one single roller which may be a take-up roller may apply the longitudinal stretching forces. The transverse stretching rollers may act upon the sheet while it is still in the plastic state, while the longitudinal stretch may be applied either whilst the sheet is still in the plastic state or after it has become actually set, the tension applied by the stretching roller in the latter case carrying forward to the part of the sheet which is still plastic. It is especially useful to produce a comparatively high longitudinal extension while retaining the original width of the film or foil or while increasing it to a relatively small extent.

The stretching forces may be operative upon the sheet or foil directly from the extrusion orifice, or suitable resistances may be inserted so as to prevent the stretching forces from operating upon the sheet until after a certain amount of coagulation has taken place. Thus, for instance, the incipient sheet or foil may be carried round one or more rotating rollers in the coagulating medium and the angle of contact may be adjusted to provide sufficient resistance to prevent the whole of the longitudinal stretching forces from being operative directly from the extrusion orifice, or to prevent any desired portion of the said stretching forces being operative from this point.

Instead of or in addition to applying longitudinal stretching forces with or without transverse stretching forces to the films or sheets while they are actually being coagulated, the coagulation may be carried through to completion or nearly to completion, and solvents or softening agents may thereafter be applied to the sheet or foil so as to bring it to a plastic or semi-plastic state and the appropriate stretching forces then applied. Such solvents or softening agents may be similar to those already referred to for use as coagulating media.

Before collecting the formed sheet or foil excess of solvent contained therein should be washed out or otherwise removed so as to prevent damage to the sheet or foil on the collecting roller. If a product of low lustre is to be produced simple washing with water or other non-solvent for the cellulose derivative which dissolves the solvent in the film or sheet may be used. In order, however, to obtain a transparent product of medium or high lustre, it is desirable to remove the solvent or softening agent gradually, for instance by washing with a solution of the solvent or softening agent in lower concentration than that in which it was present in the coagulating medium, or by treatment with solutions of salts which prevent substantial decrease in the lustre of the product. After washing the product may be dried by any suitable process. The washing or the washing and drying may both precede contact of the sheet or film with the longitudinal stretching means, and the fully coagulated or set sheet or film may be the means of transmitting the tension thus applied to the more or less soft or plastic part of the sheet. The film or foil may if desired be subjected to a polishing operation prior to winding, as for example by application of glycerine or other agent of relatively low softening power, and passage of the material through polishing rollers. Such polishing rollers may if desired be heated. After drying the materials may be collected on a roller or any other device, or prior to such collection they may be subjected continuously with their production to any desired after-treatment, as for example a treatment designed to coat one or both sides with a material adapted to improve the waterproof properties, for example higher fatty acid esters of cellulose, nitro-cellulose or nitro-cellulose containing certain gums or resins, or may be printed, embossed or otherwise treated.

As previously indicated the invention is of particular importance in relation to the manufacture of foils for wrapping purposes. Such foils may be manufactured in any desired width, as for example a width of 12 inches or 20 inches or up to 40 inches or more.

Whilst the invention has been described principally with relation to the production of sheets or foils of cellulose acetate, it is not limited thereto and other cellulose derivatives may be employed. Thus for example, other cellulose esters, e. g. cellulose formate, propionate, butyrate, stearate, laurate, palmitate, crotonate and oleate; cellulose ethers, e. g. methyl, ethyl, butyl, benzyl, allyl and crotyl celluloses and the ethers produced according to the process described in British Application No. 4953/32, filed February 19, 1932; and also mixed ethers and mixed esters, e. g. cellulose nitroacetate, cellulose aceto-sterate; mixed ether-esters of cellulose and substituted ethers and ether-esters of cellulose, e. g. oxyethyl cellulose and oxy-ethyl cellulose acetate may be employed.

The accompanying drawing illustrates suitable apparatus which may be employed in carrying out the process of the present invention, but are not to be considered as limiting the invention in any way.

Fig. 1 is a plan view of a stretching mechanism, Fig. 2 a diagrammatic view showing the stretching mechanism in conjunction with a foil-producing machine of the drum type, and Fig. 3 is a detail of the stretching mechanism.

Figs. 4 and 5 are views corresponding to Figs. 1 and 2 illustrating a further form of stretching mechanism.

Referring to Figs. 1 to 3, the film-forming solution is extruded from a box 6 on to the periphery of a wheel 7 rotating in a setting bath 8. After being stripped from the wheel 7 the foil 9 is guided round rollers 10 through the bath 8 to a roller 11 from which it proceeds to a guide roller 12 to be batched as shown at 13.

The stretching apparatus located between the rollers 11 and 12 consists of series of pairs of rubber-covered rollers 14 at each side of the foil, the first of the rollers encountered by the foil having their axes transverse to the foil, while the subsequent pair of rollers have their axes inclined, as shown in Fig. 1. The rollers nip the edges of the foil firmly and are driven by suitable gears 15 from shafts 16, these being geared together by a shaft 17 driven by means such as a chain 18. Transverse setting of the second and subsequent pairs of rollers 14 exerts a transverse pull on the foil 9 and causes it to increase gradually in width until it leaves the last pairs of rolls. By adjustment of the inclination of the rollers, the amount of transverse stretch may be controlled.

Preferably the peripheral speed of one pair of rolls is somewhat higher than that of the preceding pair, so that in addition to the transverse stretching of the foil a longitudinal stretch is applied. These differences in speed can conveniently be provided by varying the ratios of the various driving gears 15. Further, the first pair of rolls 14 may have a peripheral speed greater than that of the drum 7, so that longitudinal stretch is applied to the foil in its passage over the rolls 10 through the bath 8.

A casing 19 surrounding the stretching apparatus as shown in Fig. 2 enables the foil to be withdrawn from the bath 8 in an incompletely coagulated condition and maintains it essentially in this condition while stretching is taking place.

In Figs. 4 and 5 the streching mechanism consists of pairs of endless bands 20 at each side of the foil and inclined in accordance with the amount of transverse stretch to be imparted. The foil enters between the bands 20 as they pass round the rollers 21 and is held nipped between the bands by means of pressure rollers 22 arranged on both sides of the endless bands as shown in Fig. 5. The foil is thus firmly nipped by the bands and pulled outwardly as the bands follow their inclined paths. At the rollers 23 the foil is released from the bands and passes over the guide roller 12 to the batch roller 13. If desired the linear speeds of the bands 20 may be such that the foil is stretched between the rollers 21 and the drum 7 in its passage through the bath 8. The rollers 23 are driven by chains 24 and may be geared to the rollers 21 by the chains 25.

The following example illustrates the invention but it is to be clearly understood that it does not limit it in any way.

*Example*

A 20 to 25% solution of cellulose acetate in acetone is extruded through a suitably shaped orifice on to a film casting wheel, wholly or partially immersed in a coagulating bath consisting of 60 parts by volume of diacetone alcohol and 40 parts by volume of water. The coagulated film is drawn off from the casting wheel and led to a suitable device adapted to apply stretch to the material.

What I claim and desire to secure by Letters Patent is:—

1. Process for the production of films, foils, sheets and the like, which comprises continuously extruding a solution containing a cellulose derivative into a coagulating bath containing a softening agent for the cellulose derivative in such an amount that the content of softening agent in the extruded product is increased, positively stretching the product while it contains the added softening agent so as to increase its width and removing at least part of said softening agent therefrom.

2. Process for the production of films, foils, sheets and the like, which comprises continuously extruding a solution containing cellulose acetate into a coagulating bath containing a softening agent for the cellulose acetate in such an amount that the content of softening agent in the extruded product is increased, positively stretching the product while it contains the added softening agent so as to increase its width and removing at least part of said softening agent therefrom.

3. Process for the production of films, foils, sheets and the like, which comprises continuously extruding a solution containing a cellulose derivative into a coagulating bath containing a softening agent for the cellulose derivative in such an amount that the content of softening agent in the extruded product is increased, positively stretching the product in two directions while it contains the added softening agent so as to increase the width and the length of the product and removing at least part of the said softening agent therefrom.

4. Process for the production of films, foils, sheets and the like, which comprises extruding a solution containing a cellulose derivative into a coagulating bath containing a softening agent for the cellulose derivative in such an amount that the content of softening agent in the extruded product is increased, positively stretching the product while it contains the added softening agent in two directions simultaneously so as to increase both the length and the width of the product, and removing at least part of the said softening agent from the product.

5. Process for the production of films, foils, sheets and the like, which comprises extruding a solution containing a cellulose derivative into a coagulating bath containing a softening agent for the cellulose derivative in such an amount that the content of the softening agent in the extruded product is increased, said softening agent being dissolved in a non-solvent for the cellulose derivative more volatile than the softening agent, positively stretching the product while it contains the added softening agent so as to increase its width, and removing at least part of said softening agent from the product.

6. Process for the production of films, foils, sheets and the like, which comprises extruding a solution containing cellulose acetate into a 20%–60% aqueous solution of a compound selected from the group consisting of diacetone alcohol, ethyl tartrate and ethyl lactate, positively stretching the product in two directions while it contains the added compound so as to increase its width and length, and subsequently removing at least part of the softening agent from the product.

7. Process for the production of films, foils, sheets and the like, which comprises extruding a solution containing cellulose acetate into a 20%–60% aqueous solution of a compound selected from the group consisting of diacetone alcohol, ethyl tartrate and ethyl lactate, positively stretching the product in two directions while it contains the added compound so as simultaneously to increase its width and length, and subsequently removing at least part of the softening agent from the product.

8. In a process for the manufacture by the wet method of thin foils of cellulose derivative material for wrapping purposes, the combination of steps which comprises effecting coagulation in a medium containing a softening agent for the cellulose derivative in such an amount that the content of softening agent in the extruded product is increased, positively stretching the foil while still containing said added softening agent so as to increase both its width and its length, and removing at least a part of said softening agent.

9. In a process for the manufacture by the wet method of thin foils of cellulose acetate material for wrapping purposes, the combination of steps which comprises effecting coagulation in a medium containing a softening agent selected from the group consisting of diacetone alcohol, ethyl tartrate and ethyl lactate in such an amount that the content of softening agent in the extruded product is increased, positively stretching the foil while still containing said added softening agent so as to increase both its width and its length, and removing at least a part of said compound.

10. In a process for the manufacture by the wet method of thin foils of cellulose acetate material for wrapping purposes, the combination of steps which comprises effecting coagulation in a medium containing a softening agent selected from the group consisting of diacetone alcohol, ethyl tartrate and methyl lactate in such an amount that the content of softening agent in the extruded product is increased, positively stretching the foil while still containing said added softening agent so as simultaneously to increase both its width and its length, and removing at least a part of said compound.

HENRY DREYFUS.